United States Patent
Cain et al.

(10) Patent No.: US 7,390,522 B2
(45) Date of Patent: Jun. 24, 2008

(54) COMPOSITION AND COATED BAKERY PRODUCTS

(75) Inventors: Frederick William Cain, Wormerveer (NL); Timothy Scott Surin, Channanhon, IL (US); Gerald Patrick McNeill, Channahon, IL (US)

(73) Assignee: Loders Croklaan USA LLC, Channahon, IL (US)

( * ) Notice: Subject to any disclaimer, the term of this patent is extended or adjusted under 35 U.S.C. 154(b) by 788 days.

(21) Appl. No.: 10/972,615

(22) Filed: Oct. 26, 2004

(65) Prior Publication Data

US 2006/0088652 A1 Apr. 27, 2006

(51) Int. Cl.
*A23D 9/00* (2006.01)

(52) U.S. Cl. .................. 426/607; 426/631; 426/93

(58) Field of Classification Search .............. 426/607, 426/631, 93
See application file for complete search history.

(56) References Cited

U.S. PATENT DOCUMENTS

| | | | |
|---|---|---|---|
| 2,979,407 A | 4/1961 | Duck | 99/23 |
| 3,491,677 A | 1/1970 | Bracco et al. | 99/23 |
| 5,324,533 A | 6/1994 | Cain et al. | 426/607 |
| 5,431,948 A | 7/1995 | Cain et al. | 426/607 |
| 5,476,676 A | 12/1995 | Cain et al. | 426/607 |
| 5,554,408 A | 9/1996 | Cain et al. | 426/607 |
| 5,576,045 A | 11/1996 | Cain et al. | 426/607 |
| 5,858,445 A * | 1/1999 | Huizinga et al. | 426/607 |
| 6,162,623 A | 12/2000 | Grote et al. | 435/134 |
| 2002/0001662 A1 | 1/2002 | Sahasranamam | 426/606 |
| 2005/0129833 A1 * | 6/2005 | Kincaid et al. | 426/631 |

FOREIGN PATENT DOCUMENTS

| | | |
|---|---|---|
| CA | 2098314 * | 6/1993 |
| CA | 2098314 A1 | 12/1994 |
| EP | 0 089 082 A1 | 9/1983 |
| EP | 0 536 824 A1 | 4/1993 |
| EP | 0 555 917 A1 | 8/1993 |
| EP | 1 159 877 A2 | 12/2001 |
| GB | 1 245 539 | 9/1971 |
| GB | 2 270 925 | 3/1994 |
| WO | WO 96/19115 | 6/1996 |

OTHER PUBLICATIONS

Kun et al., "Interesterification—A Useful Means of Processing Palm Oil Products for Use in Table Margarine", Palm Oil Developments, 16:6-10 (1992).

* cited by examiner

*Primary Examiner*—Carolyn Paden
(74) *Attorney, Agent, or Firm*—Morgan, Lewis & Bockius LLP

(57) ABSTRACT

A composition which is suitable as a replacement for chocolate comprises: at least one ingredient selected from the group consisting of cocoa-derived materials and sugars; and at least 25% by weight of a fat phase, said fat phase comprising at least 60% by weight of the fat phase of a triglyceride mixture of the (H2M+M2H) type, wherein H is selected from saturated fatty acids having at least 16 carbon atoms and monounsaturated fatty acids having 18 carbon atoms and M is selected from saturated fatty acids having from 8 to 14 carbon atoms, and the triglyceride mixture comprises said monounsaturated fatty acids having 18 carbon atoms at a level of between 3 and 25% by weight based on total fatty acids. The composition may be used to coat bakery products.

18 Claims, No Drawings

COMPOSITION AND COATED BAKERY PRODUCTS

BACKGROUND OF THE INVENTION

This invention relates to a composition, to bakery products coated with the composition, to a method of forming a coated bakery product and to the use of the composition for coating a bakery product.

Bakery products such as donuts, cakes, cookies, biscuits and pastries are often coated with a layer of chocolate. The coating can be partial or complete. Although the coating can be chocolate, it is sometimes preferable to use a chocolate composition that contains triglycerides as anti-bloom agents.

Chocolate compositions that have increased resistance to blooming are described in U.S. Pat. Nos. 5,324,533, 5,476,676, 5,576,045 and 5,554,408. The compositions contain triglyceride mixtures of the H2M or (H2M+M2H) type, where H is a relatively long chain saturated fatty acid containing 16 to 24 carbon atoms and M is a shorter chain saturated fatty acid containing 10 to 14 carbon atoms. Bloom-inhibited chocolate is disclosed in U.S. Pat. Nos. 2,979,407 and 3,491,677.

U.S. Pat. No. 5,431,948 describes bloom-inhibiting fat blends. The blends are of two or three components including an (H2M+M2H) type triglyceride and a triglyceride component which contains unsaturated carboxylic acids.

Non-temper confectionery fats are disclosed in EP-A-0555917 and EP-A-0536824.

EP-A-0089082 relates to a margarine fat blend comprising a liquid oil and a hardstock. The hardstock can be used for producing diet margarines. EP-A-1159877 discloses a trans free structural hard fat for margarine blend and spreads. There is no disclosure of any other application of the fat.

There is no disclosure in the documents mentioned above of a composition which is suitable as a replacement for chocolate in which a triglyceride of the (H2M+M2H) type contains H groups that have unsaturation. Throughout this specification and contrary to the terminology sometimes used in the art and in the documents mentioned above, H refers to fatty acids selected from saturated fatty acids having at least 16 carbon atoms and monounsaturated fatty acids having 18 carbon atoms. Surprisingly, it has been found that such triglycerides are advantageous when used in compositions for replacing chocolate, particularly, but not exclusively, when used as coatings for bakery products.

SUMMARY OF THE INVENTION

According to the invention, there is provided a composition which is suitable as a replacement for chocolate comprising: at least one ingredient selected from the group consisting of cocoa-derived materials and sugars; and at least 25% by weight of a fat phase, said fat phase comprising at least 60% by weight of the fat phase of a triglyceride mixture of the (H2M+M2H) type, wherein H is selected from saturated fatty acids having at least 16 carbon atoms and monounsaturated fatty acids having 18 carbon atoms and M is selected from saturated fatty acids having from 8 to 14 carbon atoms, and the triglyceride mixture comprises said monounsaturated fatty acids having 18 carbon atoms at a level of between 3 and 25% by weight based on total fatty acids.

The invention also provides a bakery product at least partly coated with a composition according to the invention.

Further provided by the invention is a method of forming a coated bakery product which comprises applying to at least a part of an uncoated confectionery product a composition according to the invention.

The invention also provides the use of a composition according to the invention for at least partially coating a bakery product.

DETAIL DESCRIPTION OF THE INVENTION

Compositions of the invention are edible and are suitable as replacements for chocolate in a number of applications. The compositions may replace all of the chocolate, or just a part of the chocolate (i.e., the composition may be mixed with chocolate) in any given application. The compositions are particularly suitable as replacements for chocolate when used as a coating.

Compositions of the invention contain at least 25% by weight of a fat phase. The balance of the compositions can be made up of a gaseous phase, an aqueous phase, a solid phase, or mixtures thereof. Preferably, the fat phase comprises at least 70% by weight of the triglyceride mixture, more preferably 80 to 95% by weight of the triglyceride mixture. The fat phase may comprise other triglycerides, which are triglycerides other than those of the (H2M+M2H) type, for example cocoa butter and cocoa butter replacers.

The terms H2M, M2H and related terms used herein refer to the stoichiometric composition of the triglyceride and do not imply any particular order for the fatty acids on the glyceryl group. Thus, for example, H2M refers to HHM and HMH triglycerides.

Preferably, the weight ratio of triglycerides having 40-46 carbon atoms to triglycerides having 30-38 carbon atoms is from 1 to 20, more preferably from 1.5 to 6. Where reference is made herein to the number of carbon atoms in the triglycerides, this does not include the three carbon atoms in the glycerol residue. The number of carbon atoms can be determined by standard carbon number analysis.

The triglyceride mixture in the compositions of the invention is of the (H2M+M2H) type. Triglycerides of the (H2M+M2H) type are disclosed in, for example, U.S. Pat. Nos. 5,431,948, 5,576,045 and 5,476,676. Preferably, the triglyceride mixture of the (H2M+M2H) type comprises at least 50% by weight, more preferably at least 60% by weight, most preferably at least 60% by weight, such as at least 80% by weight, based on the weight of the mixture of H2M and M2H triglycerides. Since the triglyceride mixture can contain a substantially random distribution of fatty acids, it will be appreciated that the triglyceride mixture will also comprise a proportion of H3 and M3 triglycerides.

The triglyceride mixture used in the compositions of the invention comprises one or more monounsaturated fatty acids having 18 carbon atoms atoms in an amount of between 3 and 25% by weight based on total fatty acids in the triglyceride mixture. Preferably, monounsaturated fatty acids having 18 carbon atoms are present at a level of between 10 and 20% by weight based on total fatty acids. The monounsaturated fatty acids having 18 carbon atoms are linked to the triglyceride as H groups, as defined above. Thus the triglyceride mixture used in the compositions will typically comprise H'2O, H'M'O and M'2O triglycerides, wherein H' and M' are defined in the same way as H and M, respectively, above, and O is monounsaturated fatty acid having 18 carbon atoms.

Preferably, the fatty acids in the triglyceride compositions of the invention are straight chain. Preferred fatty acids for M are lauric and myristic acids and mixtures thereof. Preferred fatty acids for H are palmitic and stearic acid, preferably palmitic acid. Since the fatty acids are typically derived from natural sources, it will be appreciated that the fatty acids may be a mixture of different fatty acids and the preferences expressed herein in this case reflect the major components of the mixture (e.g., greater than 50% by weight of the fatty acids in the mixture). The monounsaturated fatty acid having 18 carbon atoms is preferably oleic acid.

The triglyceride mixture of the invention is obtainable in a number of ways. One way in which the triglyceride mixture can be obtained is by the interesterification of: (a) a vegetable oil high in triglycerides with fatty acid residues having at least 16 carbon atoms (e.g., containing at least 50% by weight of such fatty acid residues based on total weight of fatty acids); and (b) a triglyceride rich in lauric acid residues, myristic acid residues or a mixture thereof (e.g., containing at least 60% by weight of such fatty acid residues based on total weight of fatty acids). The monounsaturated fatty acid having 18 carbon atoms is preferably present in either (a) or (b), and more preferably it is present in (a), typically at a level of at least about 30% by weight based on total weight of fatty acids. For example, the triglyceride mixture is obtainable by the interesterification of a palm oil stearine as component (a), preferably a dry fractionated palm oil stearine, and a palm kernel stearine as component (b), preferably a dry fractionated palm kernel stearine.

Although it is possible to use triglycerides which have been hardened (e.g., by hydrogenation), this is less preferred. Therefore, the triglycerides present in the composition are preferably not hardened. The composition is preferably free of or substantially free of trans fats, for example it may contain less than 2% by weight, preferably less than 1% by weight, more preferably less than 0.5% by weight of trans fatty acids based on total fatty acids.

The triglyceride mixture preferably has a melting point of at least 35° C., more preferably at least 40° C. It will be appreciated that the triglyceride mixture will not have a well-deifned melting point but will melt over a range of temperatures. The melting points mentioned herein refer to the temperature at which at least 50% by weight of the triglyceride is molten.

Preferably, the triglyceride mixture has a weight ratio of saturated fatty acids containing 12 carbon atoms to saturated fatty acids containing 14 carbon atoms of more than 1.5, more preferably more than 2, such as from 2 to 5.

The composition of the invention is suitable as a replacement for chocolate, for example in coatings, such as coatings for bakery products. The chocolate composition can have the colour and/or flavour of plain chocolate or milk chocolate.

Compositions of the invention comprise at least one ingredient selected from the group consisting of cocoa-derived materials and sugars. The cocoa-derived materials are preferably selected from the group consisting of cocoa powder, cocoa mass and cocoa solids. Other cocoa-derived materials include chocolate flavours and colours. Sugars include sucrose, fructose and glucose. Sucrose is preferred. Other optional components of the compositions include dairy powders, such as skimmed milk powder, salt and emulsifiers such as lecithin.

The composition of the invention can be used to coat bakery products. The term "bakery products", as used herein, refers to products that are typically sold in a bakery and which have preferably been baked or fried, although they can be produced in other ways. The coating can be partial or complete and, when the coating is complete, the composition will encapsulate the bakery product. The bakery products are preferably made using flour. Examples of bakery products are donuts, cakes, biscuits, pastries and cookies. Donuts optionally contain jam or jelly.

Coated bakery products can be produced by heating the composition to around or above the melting point of the composition (e.g., above 35° C.), applying the composition to an uncoated bakery product (e.g., by pouring the composition onto the uncoated bakery product or by immersing the uncoated bakery product in the composition) and lowering the temperature to below the melting point of the composition by allowing to cool (or by forced cooling). Suitable methods are well-known to those skilled in the art.

The coated bakery products may be further decorated with ingredients that adhere to the coating of the composition such as icing and/or chocolate strands or chips or sugar strands (which can be of a single colour or multi-coloured).

It has been found that compositions of the invention provide a coated bakery product which is highly acceptable to the consumer. For example, the coatings made using the composition may have better gloss and/or better bloom resistance. The compositions may have the further advantage of easier processing to form coatings, which may be due to lower viscosity in the molten state.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

The following non-limiting example illustrates the invention and does not limit its scope in any way. In the examples and throughout this specification, all percentages, parts and ratios are by weight unless indicated otherwise.

EXAMPLE

This example describes the preparation and evaluation of a coating fat of the invention as a chocolate flavoured coating on doughnuts.

The coating fat was made by interesterifying a blend of palm stearine (POs) and palm kernel stearine (PKs). The ratio of POs:PKs was 55:45. FAME (fatty acid methyl ester) analysis results for a fat prepared in this way is given in Table 1 below.

TABLE 1

FAME analysis of fat

| | Example |
|---|---|
| C6:0 | 0.00 |
| C8:0 | 0.87 |
| C10:0 | 1.27 |
| C12:0 | 24.89 |
| C14:0 | 10.36 |
| C16:0 | 36.20 |
| C16:1 | 0.00 |
| C17:0 | 0.00 |
| C18:0 | 4.26 |
| C18:1t | 1.05 |
| C18:1c | 17.48 |
| C18:2t | 0.00 |
| C18:2c | 3.40 |
| C18:3t | 0.00 |
| C18:3c | 0.00 |
| C20:0 | 0.23 |

TABLE 1-continued

FAME analysis of fat

| | Example |
|---|---|
| C20:1 | 0.00 |
| C22:0 | 0.00 |
| C22:1 | 0.00 |
| C24:0 | 0.00 |
| Total | 100.00 |
| SAFA | 78.07 |
| MUFA | 17.48 |
| PUFA | 3.40 |
| TRANS | 1.05 |
| Iodine Value | 21.82 |
| Color | 3.2 |
| FFA | 0.04 |
| RI | 37.3 |
| Melt | 38.8 |
| PV | 0.3 |
| N10 | 78.67 |
| N20 | 60.65 |
| N25 | 44.93 |
| N30 | 26.90 |
| N35 | 9.71 |
| N40 | 0.65 |

The fat was incorporated into a chocolate flavored coating using the recipe in Table 2 below. First the sugar, cocoa powder and milk powder were blended together in Hobart bowl for 5 minutes on 1st speed at 150 to 160 degrees F. Then approximately ⅓ of the melted fat was added until the mixture became paste-like. The mixture was run once through a 3 roll sugar refiner to reduce the particle size of the ingredients. The refined mass was placed in a clean Hobart bowl, to which was added the E. vanillin, lecithin, and about one half of the remaining fat while the mixer is on 1st speed. After mixing for 3 minutes, the speed was increased to $2^{nd}$ speed and held for at least an additional 10 minutes until the mixture was smooth. The remainder of the fat was blended in until smooth.

TABLE 2 chocolate flavored coating recipe

| Ingredient | Supplier | % |
|---|---|---|
| Granulated Sugar | C & H | 48 |
| Teton Alkalized Cocoa Powder | Blommer | 9 |
| NFDM Powder | Knudsen | 9 |
| Coating fat of the invention | | 33.5 |
| Lecithin | Loders Croklaan | 0.45 |
| E. Vanillin | Rhodia | 0.05 |
| TOTAL | | 100 |

The coating was placed into a table top tempering kettle at 121 deg F. to ensure constant stirring to enrobe donuts. Jumbo "Buttermaid" doughnuts were purchased in a local store, and weighed approximately 50 g each. The doughnuts were enrobed by quickly dipping them in the molten coating and passing them through a cooling tunnel set at 55 deg. F. After the doughnuts were dipped/enrobed, they averaged about 25 to 30 grams of coating.

The following day, the doughnuts were cut into bite sized pieces for sensory evaluation. A sensory panel was asked to evaluate the quality of the coating using a scale of 1 to 10, with a score of 1 being unacceptable, 5 being acceptable and 10 being excellent quality. The average score from 15 tasters was 7.7. Therefore, the coating was determined to be of good quality.

The invention claimed is:

1. A composition which is suitable as a replacement for chocolate comprising: at least one ingredient selected from the group consisting of cocoa-derived materials and sugars; and at least 25% by weight of a fat phase, said fat phase comprising at least 60% by weight of the fat phase of a triglyceride mixture of the (H2M+M2H) type, wherein H is selected from saturated fatty acids having at least 16 carbon atoms and monounsaturated fatty acids having 18 carbon atoms and M is selected from saturated fatty acids having from 8 to 14 carbon atoms, and the triglyceride mixture comprises said monounsaturated fatty acids having 18 carbon atoms at a level of between 3 and 25% by weight based on total fatty acids.

2. Composition as claimed in claim 1, wherein the fat phase comprises at least 70% by weight of the triglyceride mixture.

3. Composition as claimed in claim 1, wherein the fat phase comprises 80 to 95% by weight of the triglyceride mixture.

4. Composition as claimed in claim 1, wherein the weight ratio of triglycerides having 40-46 carbon atoms to triglycerides having 30-38 carbon atoms is from 1 to 20.

5. Composition as claimed in claim 4, wherein the weight ratio of triglycerides having 40-46 carbon atoms to triglycerides having 30-38 carbon atoms is from 1.5 to 6.

6. Composition as claimed in claim 1, wherein the triglyceride mixture comprises the monounsaturated fatty acids having 18 carbon atoms at a level of between 10 and 20% by weight based on total fatty acids.

7. Composition as claimed in claim 1, wherein the monounsaturated fatty acid having 18 carbon atoms is oleic acid.

8. Composition as claimed in claim 1, wherein the triglyceride mixture is obtainable by the interesterification of a vegetable oil high in triglycerides with fatty acid residues having at least 16 carbon atoms and a triglyceride rich in lauric acid residues, myristic acid residues or a mixture thereof.

9. Composition as claimed in claim 8, wherein the triglyceride mixture is obtainable by the interesterification of a palm oil stearine, preferably a dry fractionated palm oil stearine, and a palm kernel stearine, preferably a dry frationated palm kernel stearine.

10. Composition as claimed in claim 1, wherein the triglyceride mixture has a melting point of at least 35° C.

11. Composition as claimed in claim 1, wherein the triglyceride mixture has a melting point of at least 40° C.

12. Composition as claimed in claim 1, wherein the triglyceride mixture has a weight ratio of saturated fatty acids containing 12 carbon atoms to saturated fatty acids containing 14 carbon atoms of more than 1.5.

13. Composition as claimed in claim 1, which is suitable for replacing plain chocolate or milk chocolate.

14. Composition as claimed in claim 1, wherein the cocoa-derived materials are selected from the group consisting of cocoa powder, cocoa mass and cocoa solids.

15. Bakery product at least partly coated with a composition according to claim 1.

16. Bakery product according to claim 15 selected from the group consisting of donuts and cakes.

17. A method of forming a coated bakery product which comprises applying to at least a part of an uncoated confectionery product a composition according to claim 1.

18. Method as claimed in claim 17 wherein the bakery product is selected from the group consisting of donuts and cakes.

* * * * *